United States Patent [19]

Furlette et al.

[11] 4,294,347
[45] Oct. 13, 1981

[54] AUTOMATIC ACCUMULATING LIFT AND CARRY TRANSFER MECHANISM

[76] Inventors: James L. Furlette; Donald A. Stadler, both of 1101 Copper Ave., Fenton, Mich. 48430

[21] Appl. No.: 13,458

[22] Filed: Feb. 21, 1979

[51] Int. Cl.³ .................... B65G 23/02; B65G 43/08
[52] U.S. Cl. .................................. 198/751; 198/774
[58] Field of Search ............. 198/751, 774, 718, 460

[56] References Cited

U.S. PATENT DOCUMENTS

| | | | |
|---|---|---|---|
| 3,385,418 | 5/1968 | Broser | 198/718 |
| 3,547,254 | 12/1970 | Manetta | 198/718 |
| 3,557,943 | 1/1971 | Broser | 198/744 |
| 3,590,987 | 7/1971 | Evans et al. | 198/751 |
| 3,687,275 | 8/1972 | Broser | 198/751 |
| 3,786,911 | 1/1974 | Milazzo | 198/718 |
| 3,794,158 | 2/1974 | Greenwood | 198/718 |

*Primary Examiner*—James B. Marbert
*Assistant Examiner*—Douglas D. Watts
*Attorney, Agent, or Firm*—Gifford, VanOphem, Sheridan & Sprinkle

[57] ABSTRACT

An automatic accumulating lift and carry transfer mechanism is provided comprising an elongated frame having a plurality of work support members secured to and spaced longitudinally along the frame. Each lateral pair of work support members forms a work station adapted to receive and support a workpiece thereon. A carriage assembly is longitudinally slidably mounted to the frame and, in addition, is vertically slidable between an upper and lower position. A drive mechanism is mechanically coupled to the carriage assembly for longitudinally reciprocally moving the carriage assembly in a forward direction with the carriage assembly in its upper position for a distance equal to the interval between adjacent work stations and for subsequently retracting the carriage assembly in its lowered position. Lifting members are pivotal between an upper workpiece engaging position and a lower workpiece clearing position so that in their upper position, the lifting members will lift and carry a workpiece from one work station and to the next forward work station during the forward travel of the carriage assembly. A knockdown cam moves all of the lifting members to their lower position at or near the forwardmost travel of the carriage assembly and during the retraction of the carriage assembly. A detector lever is further associated with each work station and, in the absence of the workpiece at the work station, pivots upwardly to pivot the lifting member to its upper workpiece engaging position at or near the rearwardmost travel of the carriage assembly and to pivot all of the rearward lifting members to their upper work engaging position via link bars secured between adjacent lifting members.

13 Claims, 10 Drawing Figures

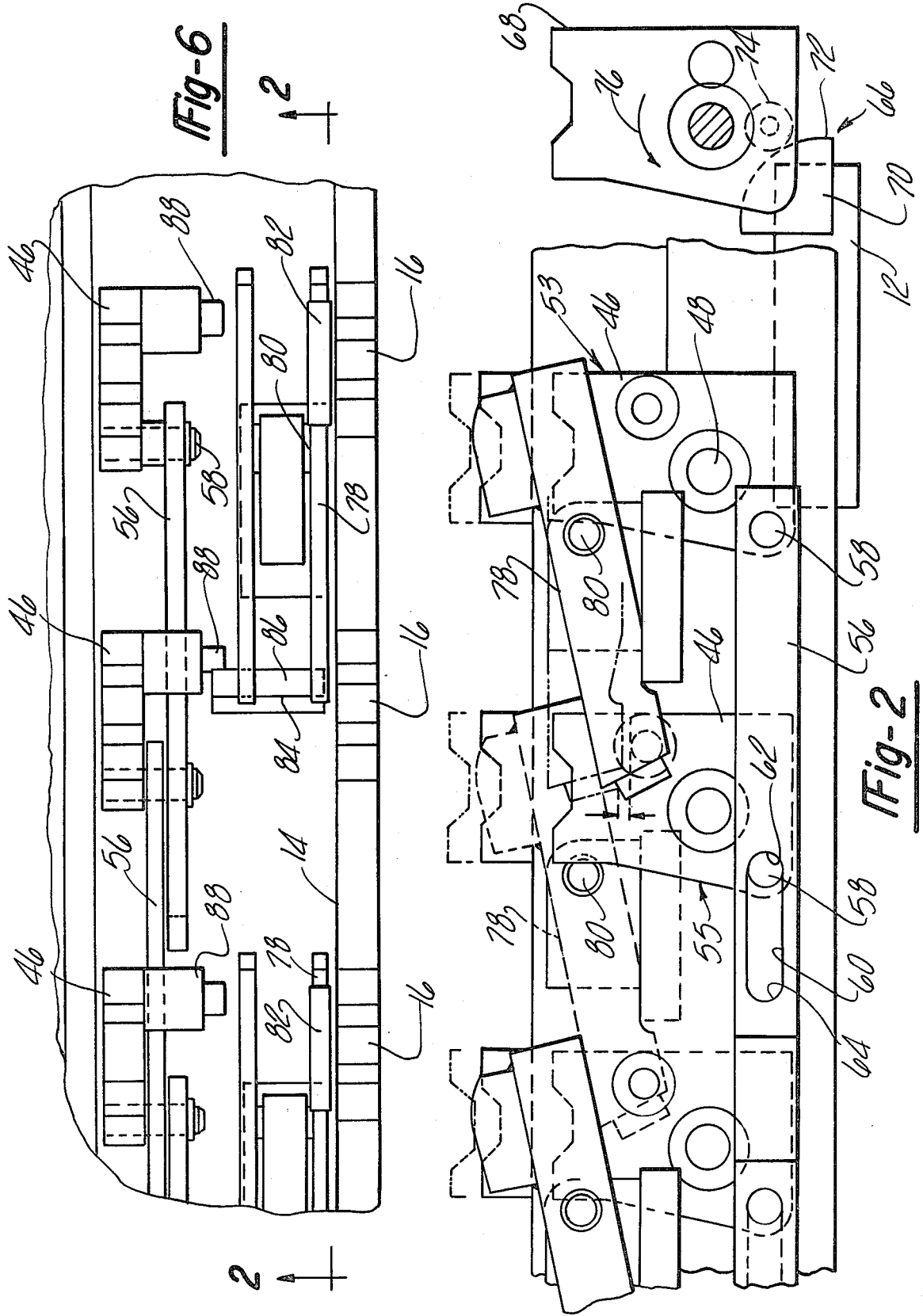

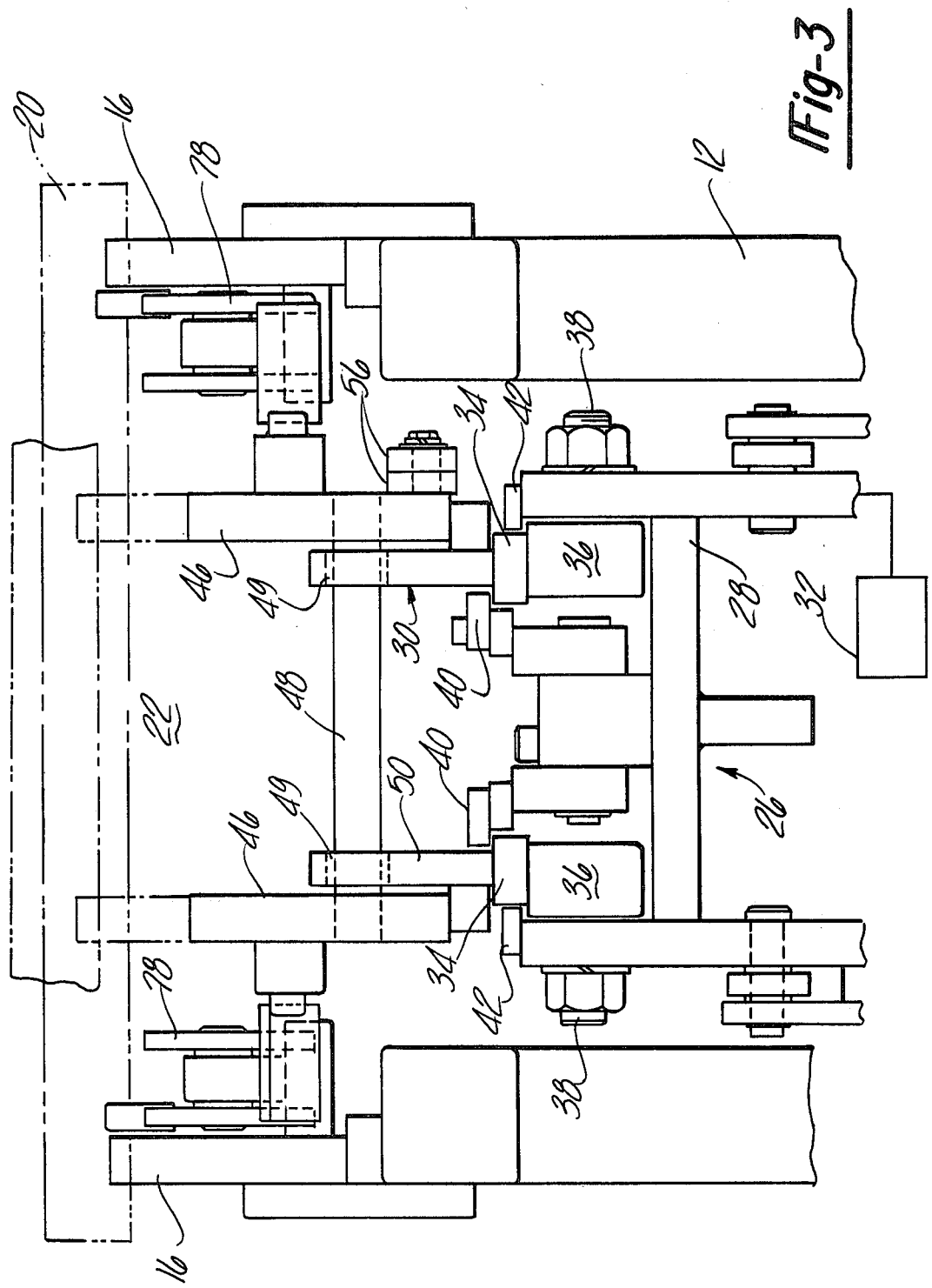

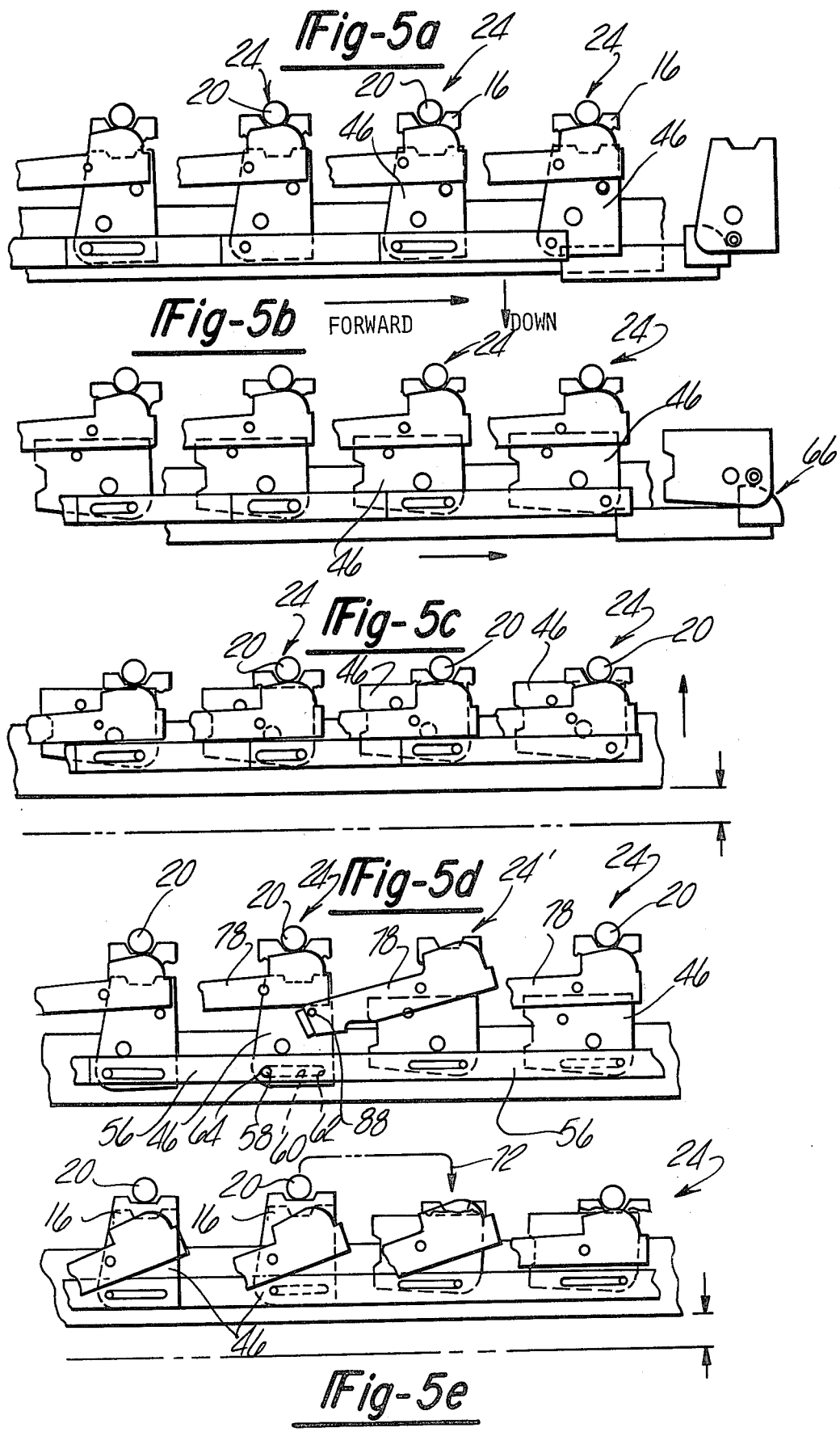

AUTOMATIC ACCUMULATING LIFT AND CARRY TRANSFER MECHANISM

BACKGROUND OF THE INVENTION

I. Field of the Invention

The present invention relates generally to mechanical transfer mechanisms and, more particularly, to a lift and carry transfer mechanism with automatic accumulating means.

II. Description of the Prior Art

Conveyors and conveyor systems are currently employed in manufacturing plants and facilities for transporting parts or pieces throughout the manufacturing plant. In one type of conveyor system, the parts or workpieces are longitudinally supported along a frame defining a conveyor track by work support members spaced at predetermined intervals along the conveyor frame.

A carriage assembly is both longitudinally and vertically slidably mounted to the conveyor frame and includes a plurality of longitudinally spaced lifting members secured to the carriage assembly so that at least one lifting member is associated with each work station. In operation, as the carriage assembly is moved to its upper vertical position, the lifting members lift the workpiece off from support members at their associated work station and, upon forward longitudinal travel of the carriage assembly, carry the workpiece to the next forward work station. At the next forward work station, the carriage assembly is moved to its lower position thus placing the workpieces on the work support members at the next forward work station after which the carriage assembly is retracted and the process is then again repeated.

Conventionally, the lifting members on the carriage assembly are rigidly secured to the carriage assembly so that the parts or workpieces positioned along the conveyor track and at the work stations are incrementally moved from one work station into the next forward work station in unison with each other. One disadvantage, however, of the lift and carry conveyor systems of this type is that a vacant space along the conveyor track caused by the absence of a workpiece at that work station will also be moved along the conveyor track in unison with the workpieces. These vacant spaces along the conveyor track, of course, are disadvantageous since the conveyor system is not used at its maximum capability. Moreover, the lack of a workpiece or part at a designated work station in predetermined intervals can cause work interruptions and even a stoppage of the entire manufacturing line.

There have, however, been previously known conveyor systems in which pusher dogs are selectively actuated or moved to an upper workpiece engaging position in dependence upon the absence of a workpiece or part at a work station. When actuated to their upper workpiece engaging position, the pusher dogs engage and slidably move a workpiece along a pair of spaced stationary rails along the conveyor track. One conveyor system of this type is disclosed in U.S. Pat. No. 3,557,943 which issued on Jan. 26, 1971, to Richard Broser.

In a pusher dog type conveyor system, however, the pusher dogs are conventionally mounted to either a conveyor frame or a carriage assembly so that the pusher dogs are pivotally secured between an upper workpiece engaging position and a lower workpiece clearing position so that retraction of the pusher dogs from their forwardmost position and to their rearwardmost position does not undesirably cause an interference between the pusher dogs and the workpieces upon the conveyor track. Conversely, in lift and carry conveyor mechanisms it is conventional to rigidly fix the lifting members to the carriage assembly and, in many cases, the lifting members themselves are merely a formed portion of the carriage assembly. Unlike the pusher dog type conveyor systems, a lift and carry conveyor system can be constructed in this fashion since the carriage is not only longitudinally slidably mounted to the conveyor frame but is also vertically movable between an upper and lower position. Consequently, with the carriage assembly in the lower position, the lifting members which are rigidly fixed to the carriage assembly will automatically clear the workpieces on the conveyor track during the retraction of the carriage assembly from its forwardmost and to its rearwardmost travel. Thus, a pivotal connection between the lifting members and the carriage assembly is neither required nor desired. For this reason, there are no other accumulating lift and carry conveyor systems known to the applicant.

SUMMARY OF THE PRESENT INVENTION

The present invention provides a lift and carry conveyor system with automatic accumulating means.

In brief, the lift and carry conveyor system according to the present invention comprises an elongated frame having a plurality of spaced and parallel work support members secured on each lateral side of the frame and at predetermined longitudinal intervals therealong. The work support members on opposite lateral sides of the conveyor frame are in alignment with each other and together define a work station adapted to receive and support a workpiece thereon.

A carriage assembly is longitudinally slidably mounted to the frame for an interval corresponding to the interval between adjacent work stations and is also vertically movable between an upper and lower position. A conventional reciprocal drive means is connected to the carriage assembly which elevates the carriage assembly to its upper position and drives the carriage assembly forwardly at intervals corresponding to the interval between adjacent work stations. The reciprocal drive means then moves the carriage assembly to its lower position and longitudinally retracts the carriage assembly for a distance also corresponding to the interval between adjacent work stations. This cycle is continuously repeated.

A plurality of lifting members are pivotally secured to the carriage assembly so that at least one, and preferably two, lifting members are associated with each work station. The lifting members are pivotal between an upper workpiece engaging position and a lower workpiece clearing position. In their upper position, the lifting members will lift a workpiece upwardly from the work supports at their associated work station and carry the workpiece to the next forward work station during reciprocation of the carriage assembly. Conversely, in their workpiece clearing position, the lifting members will not engage, but rather will pass underneath, a workpiece at their associated work station during the forward travel of the carriage assembly.

A link bar is longitudinally positioned between each adjacent pair of lifting members. Each link bar is pivotally connected by a pin to one lifting member and by a pin and slot arrangement to the next rearward lifting member. At the initiation of the retraction of the carriage assembly from its most forward and toward its most retracted position, a knockdown means engages and pivots the rearwardmost lifting member to its lower workpiece clearing position. This pivotal action of the rearwardmost lifting member in turn pivots all of the lifting members on the carriage assembly to their lower workpiece clearing position via the link bars.

A detector arm is also associated with each work station and is movable between an actuating position, in which a portion of the detector arm extends above the conveyor track at the work support member, and a nonactuating position in which the upper end of the detector arm is below the conveyor track. During its operation, a workpiece at the work station will move the detector arm to its lower or nonactuating position while, conversely, the absence of a workpiece at a particular work station will permit the detector arm associated with that work station to move by gravity to its upper or actuating position.

With the detector arm in an actuating position, indicating an absence of a workpiece at that work station, at or near the rearwardmost position and during the retraction of the carriage assembly, a cam member having a cam surface on the detector arm engages a cam pin on the lifting member associated with that work station which pivots that lifting member to its upper workpiece engaging position.

The pivoting of the lifting member to its upper workpiece engaging position by the detector arm simultaneously pivots all lifting members rearwardly of the actuated lifting member to their upper workpiece engaging position via the link bars between the lifting members. The lifting members forwardly of the most forward actuated lifting member, however, will remain in their lower workpiece clearing position due to the pin and slot connections between the link bar and the actuated lifting member. Rather, the pin will simply move to the other end of the slot in the link bar of the actuated lifting member.

After the lifting members have been selectively actuated, the carriage assembly is moved to its upper position so that the actuated lifting members lift the workpieces up from the work support members. The carriage assembly is then longitudinally forwardly extended thus carrying the workpieces to the next forward work station whereas the carriage assembly is moved to its lower position thus releasing the workpieces upon the work support members at the next forward work station. The knockdown means then pivots all of the lifting members to their lower workpiece clearing position, the carriage assembly is longitudinally retracted and the cycle is then again repeated.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 2 is a fragmentary side view showing the lift and carry transfer mechanism according to the present invention;

FIG. 3 is a transverse sectional view illustrating the lift and carry transfer mechanism according to the present invention;

FIGS. 5A-5E are diagrammatic side views illustrating the operation of the lift and carry transfer mechanism according to the present invention and with parts removed for clarity; and FIG. 6 is a fragmentary top plan view of the lift and carry mechanism according to the present invention.

DETAILED DESCRIPTION OF THE PRESENT INVENTION

Figure 1:
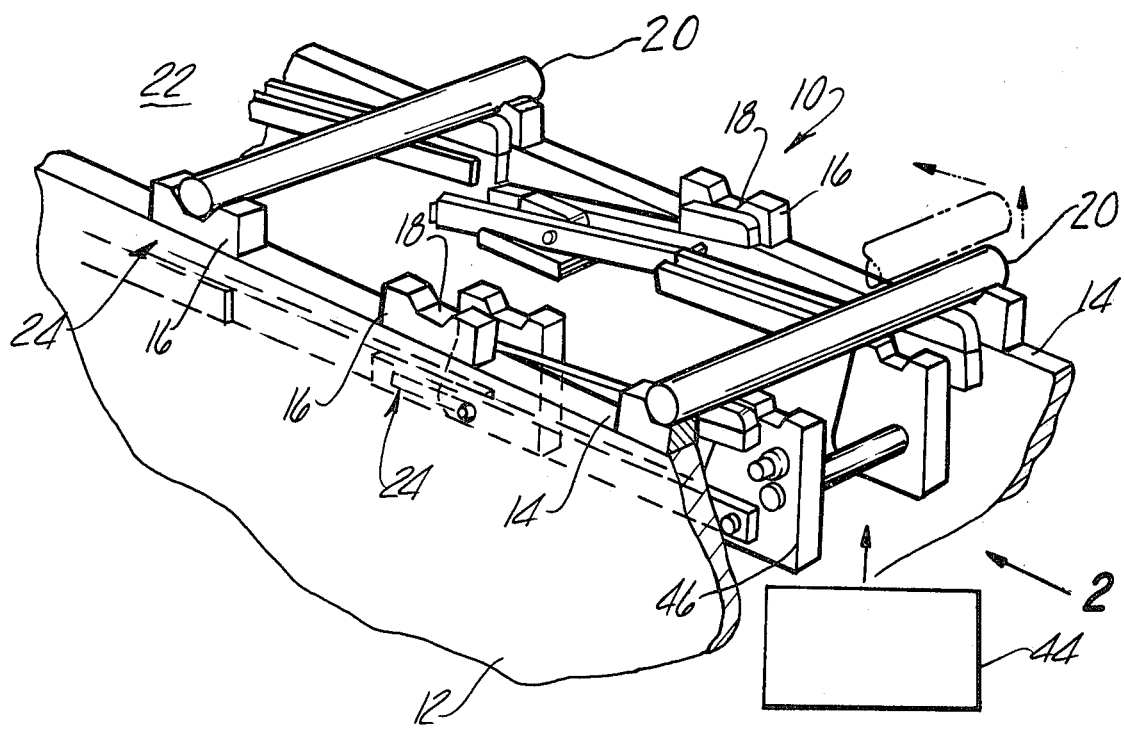
FIG. 1 is a diagrammatic perspective view showing the lift and carry transfer mechanisms according to the present invention.

With reference first to FIGS. 1, 3 and 6, the lift and carry accumulating conveyor 10 according to the present invention is thereshown comprising a frame 12 having a pair of spaced and parallel support rails 14 along the top of the frame 12. A plurality of longitudinally spaced work support members 16 are secured to each support rail 14 so that each work support member 16 on one rail 14 is in alignment with a work support member 16 on the opposite rail 14. Each stationary work support member has an upwardly facing channel 18 which is adapted to receive and hold one end of a workpiece 20 so that the workpiece 20 can be supported transversely across the rails 14 by the work support members 16.

The support rails 14 with their work support members 16 define a conveyor track 22 along which the workpieces 20 are transported. Moreover, each aligned pair of work support members 16 defines a work station 24 along the conveyor track 22 and the work stations 24 are equidistantly spaced from each other by a predetermined interval. As will become hereinafter apparent, means are provided for incrementally carrying the workpiece 20 from one work station 24 and to the next work station 24.

With reference now to FIGS. 1 and 3, the means for incrementally lifting and carrying the workpieces 20 from one work station and to the next forward station along the conveyor track 22 is thereshown and comprises a carriage assembly 26 having a lower carriage part 28 and an upper carriage part 30. The lower carriage part 28 is vertically slidably mounted with respect to the frame 12. Reciprocating means 32 (illustrated only diagrammatically) vertically reciprocally drives the lower carriage part 28 between an upper position and a lower position for a reason to be subsequently described. The reciprocating means 32 can, for example, comprise a hydraulic piston and cylinder arrangement.

The upper carriage part 30, on the other hand, is longitudinally slidably mounted to the lower carriage part 28 and is movable between a forward position and a retracted position with respect to the lower carriage part 28. The longitudinal slidable mounting means for the upper carriage part 30 further includes a pair of longitudinally extending slide rails 34 which rest upon and are supported by a pair of rollers 36 which are rotatably mounted by axles 38 to the lower carriage part 28. Guide members 40 and 42 are secured to the lower carriage part 28 to prevent lateral displacement of the upper carriage part 30 and thus maintain the slide rails 34 upon their rollers 36.

Any conventional means 44 (FIG. 1) can be used to longitudinally reciprocally drive the upper carriage part 30 between its forward position and its retracted position. For example, the longitudinal reciprocal drive means 44 can comprise a hydraulic piston and cylinder arrangement.

With reference now to FIGS. 2 and 3, a plurality of lift and carry members 46 are provided for lifting and carrying the workpieces 20 from one work station and to the next forward station. The lifting members 46 are arranged in aligned pairs along the conveyor track 22 and the lifting members 46 in each pair are secured together by a shaft 48 extending transversely therebetween so that the lifting members 46 in each pair pivot in unison with the other.

The shaft 48 in turn is rotatably mounted by bearings 49 in vertically extending journal supports 50 which are secured at their lower end to the slide rails 34. The journal supports 50 are secured to the slide rails 34, and thus to the upper carriage part 30 at spaced intervals along the conveyor track which correspond to the predetermined interval between the adjacent work stations 24.

Figure 4:
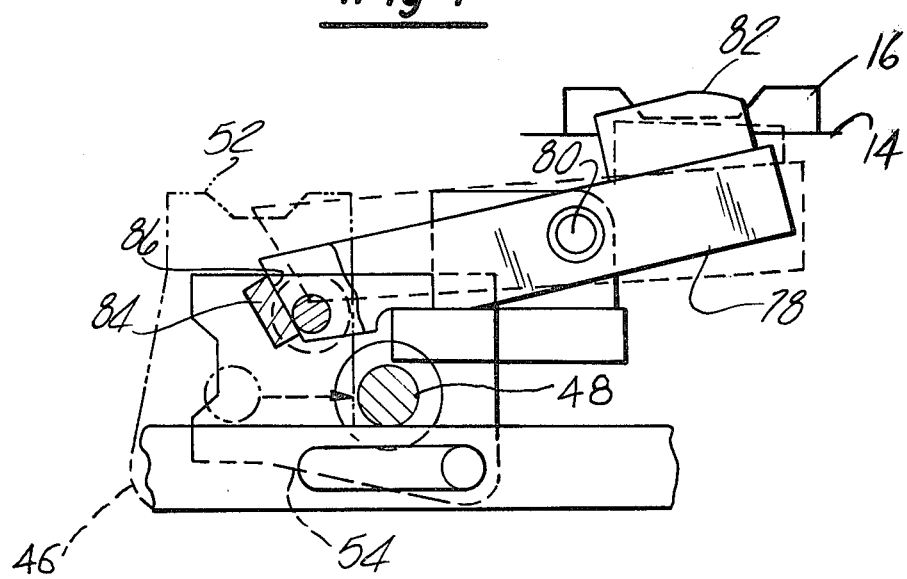
FIG. 4 is a fragmentary side view showing the operation of the detector arms for the transfer mechanism of the present invention with parts removed and enlarged for clarity.

As is best shown in FIG. 4, each pair of lifting members 46 is individually and independently movable between an upper workpiece engaging position illustrated at 52 and a lower workpiece clearing position illustrated at 54. When the lifting members are in their upper position 52 and also when the carriage assembly 26 is moved from its lower and to its upper position, the lifting members 46 will engage a workpiece 20 at their associated work stations 24 and lift it off from the stationary supports 16. Conversely, when the lifting members are in their lower position 54 and the carriage assembly 26 is moved to its upper position, the lifting members 46 will not engage, but rather will clear, the workpieces 20 at their work station 24 despite longitudinal reciprocation of the upper carriage part 30.

With reference now to FIGS. 2 and 6, an elongated link bar 56 is connected by a link bar pivot pin 58 on each lifting member 46 along one lateral side of the conveyor track 22. Each link bar 56 extends rearwardly and is connected to the next rearwardly link bar pivot pin 58 by means of a longitudinally elongated slot 60 formed through the link bar 56. The slot is longitudinally dimensioned so that rotation of one lifting member 53, (FIG. 2) from its upper and to its lower position while the next rearwardly lifting member 55 (FIG. 2) remains in its upright position will merely reposition the link bar pivot pin 58 connected to the lifting member 55 from the front 62 of the link bar slot 60 and to the rear 64 of the slot 60 but otherwise will not rotate the rearward lifting member 55.

In this fashion, two link bars 56 are connected to the link bar pivot pin 58 of each lifting member 46 (except for the forwardmost and rearwardmost lifting members 46 along the track 22). One of these link bars 56 extends rearwardly to the next rearward lifting member 46 while the other link bar 56 extends forwardly and is connected to the link bar pivot pin 58 of the next forward lifting member 46. Moreover, as is best shown in FIG. 3, since each pair of lifting members 46 is connected together by the shaft 48 for rotation in unison with each other, it is only necessary to provide the link bars 56 longitudinally on one lateral side of the conveyor track 22.

With reference now to FIG. 2, means 66 are associated with the rearward most lifting member 68 of the conveyor system 10 for pivoting all of the lifting members 46 to their lower workpiece clearing position during the retraction of the upper carriage part 30 from its forward and to its retracted longitudinal position. The knockdown means 66 further comprises a knockdown cam 70 secured to the frame 12 and having an arcuate cam surface 72. With the carriage assembly 26 in its upper position, upon forward longitudinal extension of the upper carriage part 30, the rearwardmost lifting member 68 passes over and above the cam member 70. However, when the carriage assembly 26 is moved to its lower position, the cam surface 72 engages a cam follower pin 74 on the rearwardmost lifting member 68 so that retraction of the upper part 30 of the carriage assembly 26 will pivot the rearwardmost lifting member 68 in the direction of arrow 76 and move the lifting member 68 to its lower workpiece clearing position. Simultaneously, the rearwardmost lifting member 68 pivots all of the lifting members 46 along the conveyor track 22 to their lowermost workpiece clearing position via the link bars 56.

As will be shortly described in greater detail, the lift and carry conveyor system 10 according to the present invention is an accumulating system in which the lifting members 46 are selectively actuated from their lower workpiece clearing position into their upper workpiece engaging position only when one of the work stations 24 is vacant. When this occurs the aligned pair of lifting members 46 at the forwardmost vacant work station 24 and all of the lifting members rearwardly of it are actuated to the upper workpiece engaging position. Conversely, all of the lifting members forwardly of the forwardmost vacant work station 24 remain in their lower workpiece clearing position.

The means for selectively actuating the lifting members 46 in the above described fashion is best shown in FIGS. 4 and 6 and comprises a detector arm 78 pivotally mounted by a pin 80 to the frame 12 at each work station 24. Each detector arm 78 is pivotal between an actuating position shown in solid line and nonactuating position shown in phantom line. Each arm 78 is pivotally connected to the frame 12 so that by gravity the detector arm 78 is urged toward its actuating position in which a portion 82 of the detector arm 78 extends upwardly from and above the stationary work supports 16 secured to the stationary rails 14. Conversely, in its nonactuating position, as would occur when a workpiece 20 is positioned at the work station 24, the weight of the workpiece 20 pivots the detector arm 78 in a clockwise direction (as viewed in FIG. 4) to the position shown in phantom line.

A cam 84 having a cam surface 86 is secured to the end of the detector arm 78 opposite from the portion 82 so that the cam surface 86 slopes upwardly and away from the direction of its pivot pin 80. The cam surface 86 cooperates with a cam pin 88 which is connected to and extends laterally outwardly from the upper end of the lifting members 46. When the detector arm 78 is in its nonactuating position, the detector arm cam surface 86 is pivoted upwardly and away from the cam pin 88 when the lifting member is in its lower workpiece clearing position so that the cam surface 86 does not engage the cam pin 88. Conversely, with the detector arm 78 in its actuating position, the cam surface 86 is pivoted downwardly due to the weight of the detector arm 78 so that the cam surface 86 engages the cam pin 88 during retraction of the upper part 30 of the carriage assembly 26 and just prior to the rearwardmost longitudinal position of the upper part 30 of the carriage assembly 26. Upon engagement of the cam surface 86 with the cam pin 88, the continued retraction of the carriage assembly upper part 30 pivots the lifting member 46 around the shaft 48 and to its upper workpiece engaging position 52 (FIG. 4). Since the cam surface 86 slopes rearwardly with respect to the direction of travel of the conveyor system 10, the cam surface 86 does not interfere with the lifting member 46 or its cam pin 88 upon the subsequent upward motion of the carriage assembly 26.

The actuation of the lifting member 46 by its associated detector arm 78 in turn longitudinally shifts the rearwardly extending link bar 56 associated with the actuated pusher dog rearwardly and thus, also pivots the next rearward lifting member 46 to its upper workpiece engaging position. The actuation of the next rearward lifting member in turn pivots via its rearwardly extending link bar 56 the lifting member 46 behind it to its upper position and so on throughout the conveyor system 10. In this manner, all lifting members 46 at and rearwardly of the forwardmost actuated lifting member 46 are likewise actuated or pivoted to their upper workpiece engaging position.

Each detector arm 78 further extends from one work station at which the portion 82 senses the absence of a workpiece and to the next rearward work station at which the cam surface 86 actuates the lifting member 46. Thus, to prevent interference between adjacent detector arms 78, the detector arms 78 are alternatively disposed on opposite lateral sides of the conveyor track 22 as is best shown in FIGS. 3 and 6. Since each pair of lifting members 46 are secured for rotation in unison with each other by the shaft 48, actuation of a lifting member 46 on one lateral side of the conveyor track 22 will likewise actuate the lifting member 46 in lateral alignment with it.

The operation of the conveyor system 10 according to the present invention will now be described with particular reference to FIGS. 5A–5E. Assuming that a workpiece 20 is positioned at each and every work station 24, at the forwardmost travel of the upper carriage part 30, the carriage assembly 26 is moved to its lower position by the means 32 to the position shown in FIG. 5A. The subsequent retraction of the carriage upper part 30 from its forward and to its retracted position, shown in FIG. 5B, will thus pivot all of the lifting members 46 to their lower workpiece clearing position due to the knockdown means 66 as has been previously described. During retraction of the carriage assembly upper part 30, the detector arms 78 are maintained in their upper nonactuating position due to the weight of the workpieces 20 so that none of the detector arm cam surfaces 86 engage their cooperating cam pins 88 on the lifting members 46. The reciprocal lifting means 32 then shifts the carriage assembly 26 to its upper vertical position and the upper carriage part 30 is longitudinally moved from its retracted into its forward position is shown in FIG. 5C. However, since the lifting members 46 are in their lower workpiece clearing position, the lifting members 46 do not engage the workpieces 20 and thus, do not propell the workpieces 20 along the conveyor track 22.

Assuming, however, that one work station 24' is empty (FIG. 5D) during retraction of the carriage assembly, all of the lifting members 46 are initially in their lower workpiece clearing position during the longitudinal retraction of the carriage assembly due to the knockdown means 66. The detector arm 78 at the empty work station 24', however, is now in its lower or actuating position so that as the carriage assembly upper part 30 approaches its rearwardmost position, the detector arm 78 associated with the empty work station 24' engages the lifting member cam pin 88 on the next rearward lifting member 46 and pivots it upwardly to its workpiece engaging position as is shown in FIG. 5D. The actuated lifting member 46 in turn actuates all lifting members 46 rearwardly of it via the link bars 56 but without actuation of the lifting members 46 forwardly from it. Rather, the link bar connecting pin 58 on the actuated lifting member 46 merely shifts from the front 62 of the slot 60 of the forwardly extending link bar 56 and to the rear 64 of the slot 60.

Referring now to FIG. 5E, the carriage assembly 26 is then moved to its upper position by the lifting means 32 whereupon the actuated lifting members 46 engage and lift their associated workpieces 20 at their work station 24 up off from the stationary supports 16. The upper carriage part 30 is then longitudinally moved forwardly by the means 44 to its forwardmost position and, in doing so, carries all of the workpieces 20 at and rearwardly of the actuated lifting member 46 to the next forward work station as shown by arrow 72. At the next forward station, the carriage assembly 26 is again moved to its lower position thus placing all of the transported workpieces 20 onto the stationary supports 16 at the next forward work station 24. Upon longitudinal retraction of the carriage assembly the knockdown means 66 again returns all of the actuated lifting members 46 to their lower workpiece clearing position and the cycle is again repeated.

From the foregoing it can be seen that the lift and carry accumulating conveyor system according to the present invention provides a simple and yet highly effective accumulating lift and carry conveyor mechanism.

Having described our invention, however, many modifications thereto will become apparent to those skilled in the art to which it pertains without deviation from the spirit of the invention as defined by the scope of the appended claims.

We claim:

1. A mechanical automatic accumulating transfer mechanism comprising:
   an elongated frame, said frame comprising a plurality of work support members secured to and spaced longitudinally along said frame and on each lateral side thereof, said support members on opposite lateral sides of the frame being in alignment with each other and forming a work station along the frame adapted to receive and support a workpiece;
   a carriage assembly and means for longitudinally slidably mounting said carriage assembly to said frame between a forward and a retracted position and means for vertically slidably mounting said carriage assembly to said frame between an upper and a lower position;
   means for moving said carriage assembly between said upper and said lower position;
   means for longitudinally reciprocally moving said carriage assembly in a forward direction with said carriage assembly in said upper position, and for moving said carriage in the reverse direction with said carriage assembly in its lower position;
   a plurality of lifting members pivotally secured to said carriage assembly at longitudinally spaced intervals therealong so that at least one lifting member is associated with each work station, said lifting members being pivotal between an upper workpiece engaging position and a lower workpiece clearing position whereby with said lifting members in their work engaging position, said lifting members lift and carry a workpiece from the support members at their associated work station and to the next forward work station;

knockdown means for pivoting said lifting members to their workpiece clearing position prior to the rearward longitudinal travel of said carriage assembly;

means for detecting the absence of a workpiece at a work station;

means responsive to said detecting means for actuating the lifting member associated with the vacant work station from the workpiece clearing position and to the workpiece engaging position during rearward longitudinal travel of the carriage assembly;

means for pivoting all lifting members rearwardly of a lifting member actuated by said actuating means from their workpiece clearing position and to their workpiece engaging position; and said carriage assembly further comprising an upper part and a lower part, said upper part being vertically slidably mounted to said frame, means for longitudinally slidably mounting said upper part to said lower part and said lifting members being pivotally mounted to said upper part.

2. The invention as defined in claim 1 wherein said detector means further comprises a detector arm pivotally connected at a point forward of its balance point to the frame at each work station, each detector arm being pivotal between an actuating position in which a portion at one end of the detector arm extends above the support rails at its associated work station and a nonactuating position in which said detector arm portion is positioned below the support rails at its associated work station, and cam means connected to the other end of the detector arm which engage a cooperating cam follower means on the lifting member associated with the work station, said detector arm cam means being operable to pivot said last mentioned lifting member to its upper position when said detector arm is in its actuating position.

3. The invention as defined in claim 1 wherein said pivoting means further comprises an elongated link bar extending longitudinally between each lifting member and the next rearward lifting member, each link bar having a longitudinally elongated slot at its rear end, said link bar being pivotally connected to the lifting member, and means for connecting the link bar to the next rearward lifting member comprising a pin longitudinally slidably positioned in the link bar slot.

4. The invention as defined in claim 1 wherein said knockdown means further comprises a cam member secured to said frame, said cam member being positioned to abut against a cam fall over pin on the rearwardmost lifting member of the transfer mechanism during the start of the retraction of the carriage assembly from its forward position and to its retracted position whereby said cam member pivots the rearwardmost lifting member to its lower position.

5. The invention as defined in claim 2 wherein said associated cam means comprises a pin extending laterally outwardly from said lifting member and wherein said detector arm cam means comprises a cam surface formed on the other end of said detection arm.

6. The invention as defined in claim 4 wherein the link bar pin is radially spaced from the pivotal connection of the lifting member to the carriage assembly so that pivoting of at least one lifting member to its lower position longitudinally forwardly shifts the link bar extending forwardly from that lifting member a predetermined distance to thereby pivot the next forward lifting member to its lower position.

7. The invention as defined in claim 6 wherein said predetermined distance is substantially the length of the link bar slot.

8. The invention as defined in claim 2 wherein longitudinally adjacent detector arms are disposed on opposite lateral sides of the frame.

9. The invention as defined in claim 1 wherein said means for slidably mounting said upper part to said lower part further comprises a plurality of rollers rotatably mounted to the lower part, and at least one longitudinally extending rail secured to the upper part, said rail resting on and supported by said rollers.

10. The invention as defined in claim 10 wherein said upper part further comprises a plurality of journal supports at spaced intervals therealong, and a shaft pivotally carried by each journal wherein at least one of said lifting members is secured to each shaft.

11. A mechanical automatic accumulating transfer mechanism comprising:

an elongated frame, said frame comprising a plurality of work support members secured to and spaced longitudinally along said frame and on each lateral side thereof, said support members on opposite lateral sides of the frame being in alignment with each other and forming a work station along the frame adapted to receive and support a workpiece;

a carriage assembly and means for longitudinally slidably mounting said carriage assembly to said frame between a forward and a retracted position and means for vertically slidably mounting said carriage assembly to said frame between an upper and a lower position;

means for moving said carriage assembly between said upper and said lower position;

means for longitudinally reciprocally moving said carriage assembly in a forward direction with said carriage assembly in said upper position, and for moving said carriage in the reverse direction with said carriage assembly in its lower position;

a plurality of lifting members pivotally secured to said carriage assembly at longitudinally spaced intervals therealong so that at least one lifting member is associated with each work station, said lifting members being pivotal between an upper workpiece engaging position and a lower workpiece clearing position whereby with said lifting members in their work engaging position, said lifting members lift and carry a workpiece from the support members at their associated work station and to the next forward work station;

knockdown means for pivoting said lifting members to their workpiece clearing position prior to the forward longitudinal travel of said carriage assembly;

means for detecting the absence of a workpiece at a work station;

means responsive to said detecting means for actuating the lifting member associated with the vacant work station from the workpiece clearing position and to the workpiece engaging position prior to the forward longitudinal travel of the carriage assembly;

means for pivoting all lifting members rearwardly of a lifting member actuated by said actuating means from their workpiece clearing position and to their workpiece engaging position; and said last-mentioned means further comprising an elongated link bar extending longitudinally between each lifting member and the next rearward lifting member, each link bar having a longitudinally elongated slot at its rear end, said link bar being pivotally connected to the lifting member, and means for connecting the link bar to the next rearward lifting member comprising a pin longitudinally slidably positioned in the link bar slot.

12. A mechanical automatic accumulating transfer mechanism comprising:

an elongated frame, said frame comprising a plurality of work support members secured to and spaced longitudinally along said frame and on each lateral side thereof, said support members on opposite lateral sides of the frame being in alignment with each other and forming a work station along the frame adapted to receive and support a workpiece;

a carriage assembly and means for longitudinally slidably mounting said carriage assembly to said frame between a forward and a retracted position and means for vertically slidably mounting said carriage assembly to said frame between an upper and a lower position;

means for moving said carriage assembly between said upper and said lower position;

means for longitudinally reciprocally moving said carriage assembly in a forward direction with said carriage assembly in said upper position, and for moving said carriage in the reverse direction with said carriage assembly in its lower position;

a plurality of lifting members pivotally secured to said carriage assembly at longitudinally spaced intervals therealong so that at least one lifting member is associated with each work station, said lifting members being pivotal between an upper workpiece engaging position and a lower workpiece clearing position whereby with said lifting members in their work engaging position, said lifting members lift and carry a workpiece from the support members at their associated work station and to the next forward work station;

knockdown means for pivoting said lifting members to their workpiece clearing position prior to the forward longitudinal travel of said carriage assembly;

means for detecting the absence of a workpiece at a work station;

means responsive to said detecting means for actuating the lifting member associated with the vacant work station from the workpiece clearing position and to the workpiece engaging position prior to the forward longitudinal travel of the carriage assembly;

means for pivoting all lifting members rearwardly of a lifting member actuated by said actuating means from their workpiece clearing position and to their workpiece engaging position;

said carriage assembly further comprising an upper part and a lower part, said upper part being vertically slidably mounted to said frame, means for longitudinally slidably mounting said upper part to said lower part wherein said lifting members are pivotally mounted to the upper part; and wherein said means for slidably mounting said upper part to said lower part further comprises a plurality of rollers rotatably mounted to the lower part, and at least one longitudinally extending rail secured to the upper part, said rail resting on and supported by said rollers.

13. The invention as defined in claim 12 wherein said upper part further comprises a plurality of journal supports at spaced intervals therealong, and a shaft pivotally carried by each journal wherein at least one of said lifting members is secured to each shaft.

* * * * *